(No Model.)
F. C. COOKE.
APPARATUS FOR MEASURING THE LINEAL FEET OF WORK DONE BY A WOOD WORKING MACHINE.
No. 299,745.        Patented June 3, 1884.
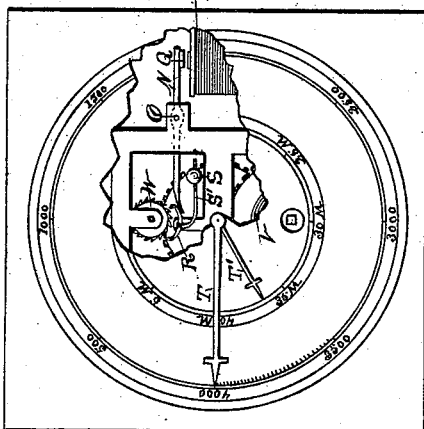
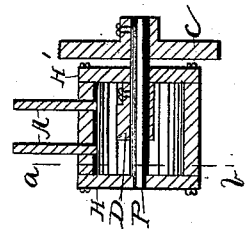
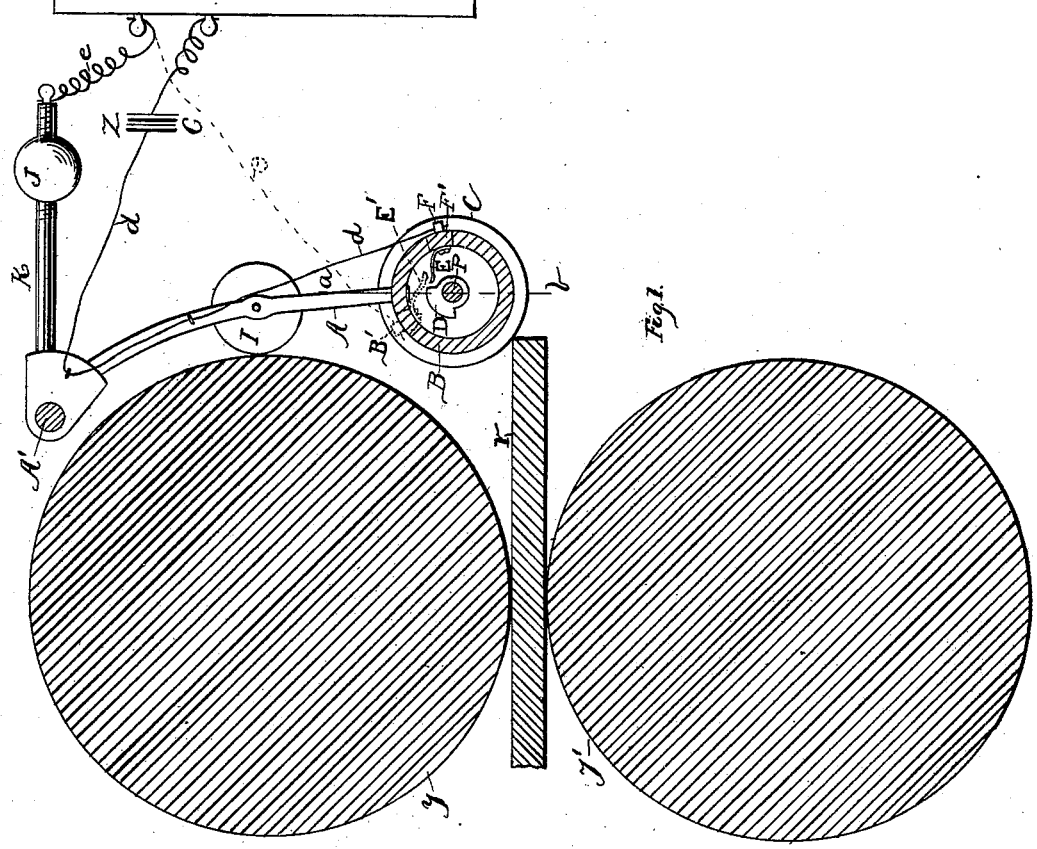
Witnesses:        Inventor.

UNITED STATES PATENT OFFICE.

FRANCIS CROSBY COOKE, OF WHITEHALL, NEW YORK.

APPARATUS FOR MEASURING THE LINEAL FEET OF WORK DONE BY A WOOD-WORKING MACHINE.

SPECIFICATION forming part of Letters Patent No. 299,745, dated June 3, 1884.

Application filed March 17, 1884. (No model.)

*To all whom it may concern:*

Be it known that I, FRANCIS CROSBY COOKE, a resident of Whitehall, in the county of Washington and State of New York, have invented certain new and useful Improvements in the Method of and Apparatus for Registering the Lineal Feet of Work Performed by a Wood-Working Machine; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in the method of and apparatus for registering the number of lineal feet run by a planer, matcher, molder, or other wood-working machine; and it consists in providing a loose disk or friction-wheel of known circumference, adapted to ride upon the wood to be worked, and to make and break an electric circuit at each revolution of the wheel, said electric circuit including an electro-magnet adapted to control the movements of an escapement-wheel in a train of wheels actuated by a spring or weight to move one or more hands over a registering-dial.

The object of my invention is to indicate or register at the office or at any desired locality the number of lineal feet of work performed by a wood-working machine.

Figure 1 of the drawings is a side elevation, partly in cross-section, of the friction-wheel and supports, showing its position relative to the wood to be worked. Fig. 2 is a plan view of the registering-dial, with a portion broken away to show the magnet and escapement-wheel. Fig. 3 is a vertical section taken at broken line *a b* in Fig. 1.

The arm A, loosely suspended from a supporting-shaft, A', supports at its lower end a hollow drum, B, fixed thereon. The ends of the drum are closed by the plates H H', fixed thereto. The plates afford bearings for the shaft P, the latter having fixed thereon within the drum the eccentric or circuit-breaker D, and upon one or both of its ends, projecting outwardly from the plates, the friction-wheel C. The contact-surface of the wheel may be roughened to cause it to adhere more firmly to the surface of the wood with which it is brought in contact. The metallic spring E is fastened to the inner surface of the drum in such a manner that its free end projects therefrom sufficiently to come in contact with the elongated portion only of the circuit-breaker D as the latter is revolved. The spring is metallically attached to the binding-post F through the non-conducting plug F'. The wheel-supporting arm A is also provided with the horizontally-projecting arm K, adapted to support an adjustable weight, J.

In wood-working machines the wood *r* is forced along into and through the machine by rollers *y y'*, and the wheel C hangs upon one side of the rolls, as shown in Fig. 1, so that the wood in passing thereunder forces the arm A away from the rolls and causes the wheel to mount the wood and ride thereon. The friction between the wheel and the wood causes the wheel to revolve, which causes the eccentric D to make and break contact with the spring E once at each revolution of the wheel. If, then, an insulated wire, *d*, is extended from the binding-post F to one pole of a battery and I connect the other pole of the battery with the eccentric, as by wire *e*, metallic arms A and K, drum B, plates H H', and shaft P, an electric circuit will be made and broken at each revolution of the wheel—*i. e.*, each time the wood *r* travels a distance equal to the circumference of the wheel C.

The binding-posts *m n* are connected with the electro-magnet L in such a manner that when the wires *d e* are connected therewith the magnet is included in the circuit before described.

The lever N, fulcrumed at O, is provided at one end with an armature, Q, adapted to be acted upon by said magnet, while the other end acts upon the forked pawl R to release the toothed escapement-wheel W and permit the same to revolve one half-notch while the magnet draws the armature down to contact with itself. When the magnet ceases to act upon the armature, the weight S, adjustable upon the arm S', restores the pawl to its former position and allows the wheel W to escape the other half-notch, from which it appears that the wheel W revolves one notch each time the circuit is made and broken, or at each revolution of the friction-wheel C. The wheel W is connected by a suitable train of gear-wheels with the hands T and T' and spring V, which actuates said wheels and hands. The parts last above described are covered by a dial, a part of which is broken away in Fig. 2. The dial may be provided with suitable marks and figures, as shown, corresponding with the movements of the hands, to indicate the number of feet of wood passing under the wheel C.

The arm A may be forked at its lower end to receive the loose fender-pulley I, adapted to ride upon roller $y$ and prevent the arm from coming in contact with the roller when the wheel C is not in use. The arms which support the threaded weights J and S are threaded, which permits of different adjustments of the weights by revolving the latter upon said arms, as required.

The train of wheels may be actuated by a weight, instead of spring V, without departing from the spirit of my invention.

I am thus enabled by my improved method and apparatus to indicate and regulate in the office of a mill or factory the number of lineal feet of work performed by a wood-working machine located in another part of the building, or even miles distant from the office.

Instead of requiring the wheel C or circuit-breaker D to form part of the electric circuit, a second binding-post, B', and spring E' (shown in dotted lines in Fig. 1) may be attached to drum B in such a manner that the eccentric D at each revolution will force one spring against the other to make the circuit, and when the springs are relieved they fly apart to break the circuit. In this case the wire $e$ would be attached to binding-post B', instead of the one on arm K. The contact-points of the springs are preferably made of platinum. In either case the contact-points are securely inclosed within the drum B, where they are protected from contact with external objects.

What I claim as new, and desire to secure by Letters Patent, is—

1. In a wood-working machine, a friction-wheel adapted to ride upon the wood, and provided with a mechanism for making and breaking an electric circuit, in combination with an electric circuit and electro-magnet actuated by said circuit, a registering-dial, indicating hand or hands, a spring or weight actuated train of wheels, and a connecting mechanism between said train of wheels and the armature of said magnet, whereby the movements of the wheels are controlled by the magnet, all the parts being arranged substantially as and for the purposes set forth.

2. The method of registering the number of lineal feet of work performed by a wood-working machine, consisting of actuating a circuit-breaker by contact with the wood to make and break an electric circuit at regular known space-intervals and registering or indicating the number of said intervals upon a spaced dial by one or more hands moved by a train of spring or weight actuated wheels controlled in their movements by the armature of a magnet operated by said circuit.

In testimony whereof I have hereunto set my hand this 1st day of March, 1884.

FRANCIS CROSBY COOKE.

Witnesses:
M. J. BROWN,
A. P. COOKE.